US005719664A

United States Patent [19]

Besesty et al.

[11] Patent Number: 5,719,664
[45] Date of Patent: Feb. 17, 1998

[54] TELEMETRY DEVICE HAVING A MICROLASER

[75] Inventors: Pascal Besesty, Vaulnaveys Le Haut; Engin Molva, Grenoble, both of France

[73] Assignee: Commissariat a l'Energie Atomique, Paris, France

[21] Appl. No.: 538,341

[22] Filed: Oct. 3, 1995

[30] Foreign Application Priority Data

Oct. 4, 1994 [FR] France .................................. 94 11847

[51] Int. Cl.$^6$ .................................................. G01C 3/08
[52] U.S. Cl. ............................................ 356/5.01; 356/5.06
[58] Field of Search .................................. 356/5.01, 5.05, 356/5.06

[56] References Cited

U.S. PATENT DOCUMENTS

| 3,737,231 | 6/1973 | Low et al. | 350/150 |
|---|---|---|---|
| 4,191,931 | 3/1980 | Kuppenheimer . | |
| 4,199,226 | 4/1980 | Weber et al. . | |
| 4,552,456 | 11/1985 | Endo | 356/5 |
| 4,782,491 | 11/1988 | Snitzer . | |
| 5,119,382 | 6/1992 | Chandler et al. . | |
| 5,153,664 | 10/1992 | Besesty et al. . | |
| 5,225,882 | 7/1993 | Hasokawa et al. | 356/5 |
| 5,359,403 | 10/1994 | Grosmann et al. | 356/5 |
| 5,394,413 | 2/1995 | Zayhowski | 372/10 |
| 5,495,494 | 2/1996 | Molva et al. | 372/98 |
| 5,502,737 | 3/1996 | Chartier et al. | 372/11 |
| 5,559,823 | 9/1996 | Valette | 372/92 |

FOREIGN PATENT DOCUMENTS

| 0 448 182 A | 8/1988 | European Pat. Off. . |
|---|---|---|
| 0 348 898 A | 6/1989 | European Pat. Off. . |
| 0 578 150 A | 2/1993 | European Pat. Off. . |
| 25 02 662 | 8/1995 | Germany . |
| 1 477 201 | 6/1977 | United Kingdom . |
| 1 566 716 | 5/1980 | United Kingdom . |
| 2 266 988 A | 11/1993 | United Kingdom . |

OTHER PUBLICATIONS

Shimoura, et al., "Microchip Lasers Fabricated by a Novel Photolithography Technique," *Mitsui Petrochemical Industries, Ltd., High Performance Materials & Products Research Laboratory*,Japan.

Mermilliod, et al., "LaMgAl$_{11}$O$_{19}$ :Nd Microchip Laser," *Appl. Phys. Lett.*59(27), pp. 3519–3520 (1991).

*Primary Examiner*—Mark Hellner
*Attorney, Agent, or Firm*—Burns, Doane, Swecker & Mathis LLP

[57] ABSTRACT

This laser telemetry device operating on the principle of the measurement of the transit time of a light pulse, is characterized in that it comprises:
a passive switching microlaser (2),
means (6, 10) for receiving a light pulse (18, 19) reflected by an object (4) and for the detection of the reception time of said pulse,
means (8, 10) for the detection of the emission time of a pulse from the microlaser (2),
means (12) for measuring the time interval or slot separating the microlaser pulse emission time and the reflected beam reception time.

18 Claims, 7 Drawing Sheets

TELEMETRY DEVICE HAVING A MICROLASER

TECHNICAL FIELD

The invention relates to a device making it possible to determine a distance by measuring the outward and return time of a light pulse between a telemeter or rangefinder and a target. The light pulse is emitted by a laser. Therefore the invention is in the field of laser telemetry or LIDAR.

It is used in short and medium distance measurement, in the car field (for developing anti-collision systems), in the dimensiometry field, in the field of the perception of the environment for robotics.

PRIOR ART

In the laser telemetry field use is made of light sources such as laser diodes or lasers.

At present, for the medium and short distance application field, use is made of two types of laser sources.

Firstly, laser diodes are used for short distance measurements, i.e. below 100 m. These diodes are limited by their peak power (approximately 30 watts), as well as by the ocular safety standards as a result of the long pulse times (7 to 10 nanoseconds). A device incorporating a laser diode is described in French patent FR-B-2 666 153.

This type of device requires the use of optics for shaping the beam emitted by the light source, a device providing protection against feedback and a switching electronics for modulating the laser beam.

The working standards relative to the problem of ocular safety (e.g. French standard NFC 43-801) gives the maximum power which can be used as a function of a pulse duration and the wavelength of the light source. Thus, for a wavelength of 1.064 μm and with a pulse of 8 nanoseconds, the maximum power is 250 watts and for a pulse duration of less than 1 nanosecond it is 2000 watts. Thus, with laser diodes one is far from such limits. With respect to semiconductor laser sources, it is possible to obtain high peak powers with a brief pulse duration, because the injection current which has to be supplied at the junction will be limited by the chokes and capacitances.

Conventional solid lasers are used for medium and long distance measurements, but they are very large, not very robust and cannot be integrated into miniaturized systems at a reasonable cost.

Moreover, the device described in FR-B-2 666 153 does not satisfy the medium distance applications with ocular safety and limited overall dimensions.

At present, no laser telemetry device with pulse-type operation is known, which makes use of a light pulse transit time and which can operate whilst respectively respecting the following constraints:
short and medium distance measurement possibility (100 to 2000 m),
compact device with possible integration,
simplified electronics not requiring a switching control,
satisfying ocular safety standards,
manufacturable at low cost due to mass production.

DESCRIPTION OF THE INVENTION

The object of the present invention is to propose a laser telemetry device operating on the principle of measuring the light pulse transit time and making it possible to achieve all the aforementioned objectives.

More specifically, the invention relates to a laser telemetry device operating on the principle of the measurement of the transit time of a light pulse and characterized in that it comprises:
a passive switching microlaser,
means for the reception of a light pulse reflected by an object and for the detection of the reception time of said pulse,
means for detecting the emission time of a microlaser pulse,
means for measuring the time interval separating the microlaser pulse emission time and the reflected beam reception time.

Due to the use of a microlaser operating on the passive switching principle, the telemetry device offers the following advantages:
it is simpler than the prior art telemetry devices, because it does not require the use of a pulse-type control electronics for the laser source (which also offers the advantage of giving an energy consumption gain) and it does not require optics for shaping the output beam and therefore no optical settings,
it permits a considerable measuring range, whilst respecting ocular safety standards, the pulses produced by the microlaser being very narrow and for a given average power respecting the ocular safety standards, it is possible to increase the telemeter or rangefinder range,
it is more robust, because it requires no optical alignment for producing the laser source,
it has interesting microlaser time characteristics, so that an improved precision can be attained,
it is much smaller, because the microlaser is very small and it is associated with an integrated optics, so that a miniature device is obtained,
it improves reliability and reproducibility, because the microlaser is manufactured by microelectronic methods, which are very reproducible and which are suitable for mass production, so that production costs can also be reduced.

According to an embodiment of the invention, the microlaser cavity has a solid active medium, an input mirror and an output mirror, as well as a saturable absorbent in the form of a thin, saturable absorbent material layer directly deposited on the solid active medium.

According to this embodiment, the structure of the microlaser consists of a stack of layers, which makes it possible to retain the possibility of mass production at low cost. This multilayer structure does not prejudice the simplicity and the mass production processes for microlasers. It permits the production of aligned, monolithic, passively switched microlasers (i.e. no optical setting) and which are underegulatable. This structure requires no operation of sticking or adhering a component of the cavity on another component of the same cavity, or any alignment operation. Moreover, compared with "codoped" lasers, i.e. in which the same medium is used both as the active medium and the saturable absorbent medium, it is possible to independently regulate the thicknesses during the deposition of the layers or by mechanical thinning after depositing the layers, as well as the concentrations of the active ions in the two media.

According to another aspect of the invention, the time interval or slot measuring means comprise:
a first clock supplying pulses with a period T,
a digital circuit for counting the number of pulses of the first clock, which are followed by a complete period T and occur between the start signal (D) and the stop signal (F),
an analog circuit for determining on the one hand the time $t_1$ separating the signal (D) and the start of the first pulse of the first clock commencing after (D) and on the other the time $t_2$ separating the stop signal (F) from the end of the final period of the first clock completed before (F) and able to convert the analog data obtained into digital data, a processing circuit for determining the duration of the time slot on the basis of data supplied by the digital circuit and those supplied by the analog circuit previously converted into digital data.

This device makes it possible to measure with very high precision very long time intervals. In addition, the start signal (D) and stop signal (F) can be completely asynchronous of the clock.

According to an embodiment of the invention, the digital circuit is provided with a second clock, whose pulses are shifted with respect to those of the first clock, the digital circuit also counting the number of pulses of the second clock followed by a complete period and occurring between the start signal (D) and the stop signal (F), the analog circuit determining on the one hand the time separating the signal (D) and the start of the first pulse of the second clock starting after (D) and on the other hand the time separating the stop signal (F) from the end of the final period of the second clock completed before (F) and said analog circuit is able to convert the analog data obtained into digital data and the device also has means able to determine which of the counts performed on one of the two clocks ($H_1$, $H_2$) Is to be taken into account, so as to resolve any ambiguity situation which could lead to a clock period counting error.

Thus, it is possible to remove any ambiguity situation in the case where at least one of the signals (D) and (F) coincides with a clock pulse.

Other aspects and embodiments will be gathered from the dependent claims.

BRIEF DESCRIPTION OF THE DRAWINGS

The invention is described in greater detail hereinafter relative to nonlimitative embodiments and the attached drawings, wherein show:

FIGS. 3a to 4b Embodiments of the laser cavity of a telemetry device according to the invention.

DETAILED DESCRIPTION OF EMBODIMENTS OF THE INVENTION

Figure 1:
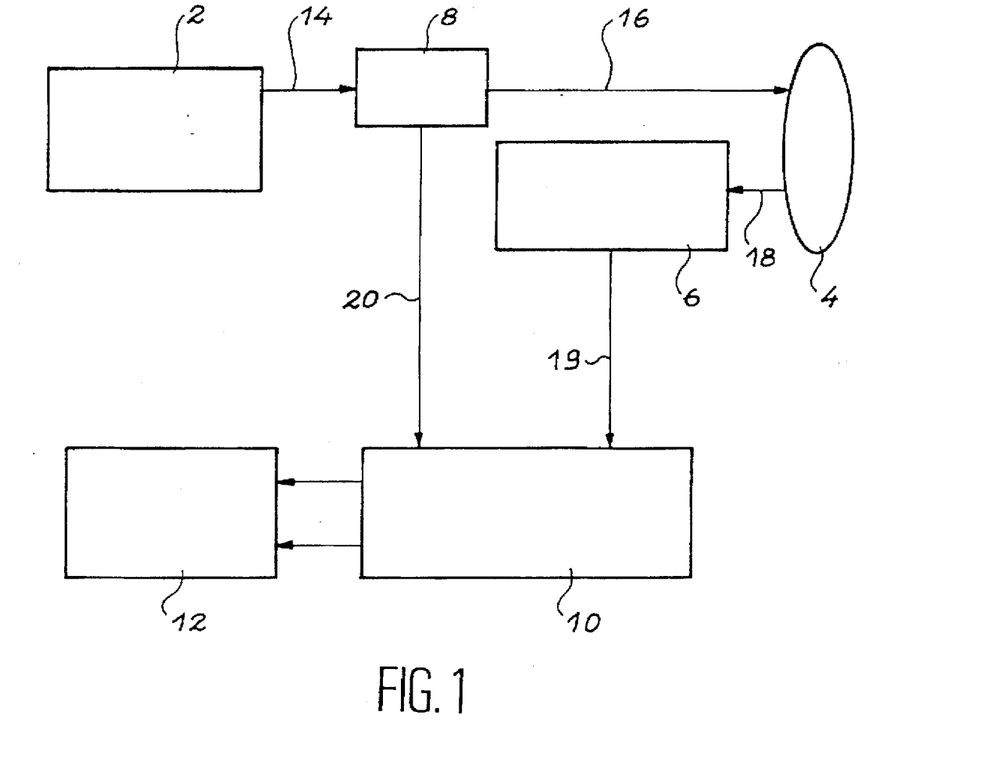
FIG. 1 A diagram illustrating the essential components of a telemetry device according to the invention.

According to FIG. 1, a device according to the invention essentially has a passive switching microlaser 2, which delivers a light beam 14 in the direction of an object 4, whose position it is wished to determine. A beam 18 reflected by said object 4 is directed to optical means 6 for receiving a light beam, such as e.g. a beam splitter combined with a reception lens. The beam 19 obtained at the outlet of the reception means 6 of the reflected beam 18 is directed to a detection circuit 10 e.g. having a photodetector component able to supply an electric pulse marking the end of the interval which is to be measured for determining the beam transit time. This circuit also incorporates an amplifier chain formed from amplifiers and which supplies to a comparator stage a signal representing the end of the interval to be measured. This signal is transmitted to the time measuring device 12.

The device also has means for detecting the emission time of a microlaser pulse. These means can incorporate in exemplified manner a device 8 for sampling part 20 of the light flux of the beam 14 emitted by the microlaser 2, e.g. a splitting plate.

Figure 2:
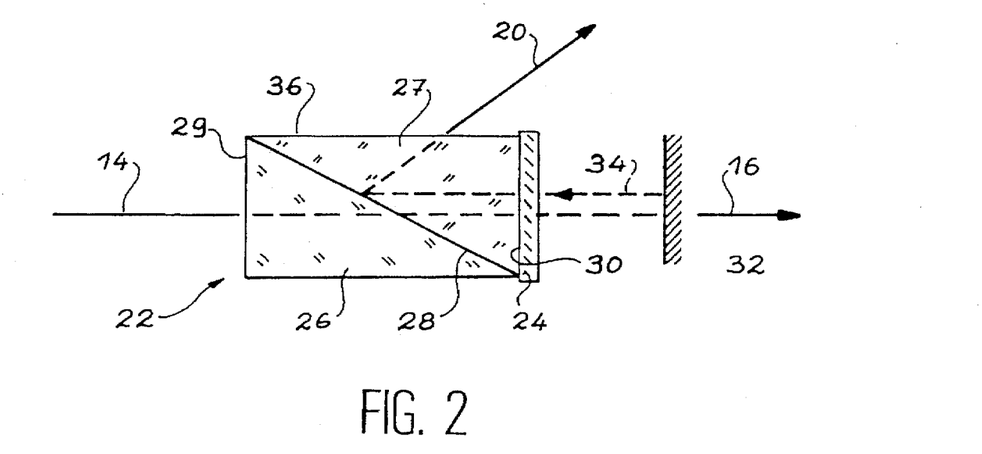
FIG. 2 An example of a device for splitting a light beam from the microlaser into a main beam and a secondary beam.

Another embodiment of said device 8 is illustrated in FIG. 2. It permits the splitting of a light beam 14 into two beams, namely a main beam 16 and a secondary beam 20, with an energy ratio between the main beam 16 and the secondary beam 20 which can be very high, e.g. exceeding 1000. In this embodiment, it comprises a linear polarizer 22 (e.g. of the Glan-Thompson type) and a quarter-wave plate 24 placed on the path of the light beam 14. The polarizer is formed from two birefringent material prisms 26, 27 assembled according to the junction face 28, the assembly forming a rectangular parallelepiped. The polarizer 22 has a light beam 14 striking a polished entrance or input face 29 belonging to the prism 26. The light beam passes out of the polarizer by the exit or output face 30, which is also polished and belongs to the prism 27. The entrance 29 and exit 30 faces are perpendicular to the path of the light beam 14. A quarter-wave plate 24, e.g. made from calcite, is adhered to the exit face 30 of the linear polarizer.

Reference numeral 32 designates an output diopter for the light beam, which can be the entrance face of an optical fibre, a lens or a glass plate.

The light beam 14 from the microlaser is firstly linearly polarized by the polarizer 22. The quarter-wave plate 24, positioned at 45° in rotation with respect to the propagation axis of the light beam 14, transforms the linear polarization into a circular polarization (45° phase shift). When the light beam encounters the diopter 32, most of it is transmitted by the diopter in order to constitute the main beam 16 and the smaller part 34 is reflected to the quarter-wave plate 24. This part 34 is constituted by the optical losses of the light beam reaching the diopter 32 and can consequently be a very low energy wave compared with the energy of the light beam 14.

The reflected beam 34, which has undergone a 180° phase shift during the reflection on the diopter 32, traverses the quarter-wave plate 24 in the direction of the microlaser 2. This beam 34 undergoes a further 45° phase shift, i.e. in all 180°+90°, and penetrates the polarizer 22. The polarizer 22 is not conductive for a wave displaced by 90° and the beam 34 is ejected to the face 36 of the prism 27. As the face 36 has been polished, a beam 20 is collected at the output of the polarizer 22.

The beam 20 constitutes the secondary beam. Its energy is proportional to the reflection coefficient of the entrance face of the diopter 32. This beam 20 is detected in the circuit 10 of FIG. 1, e.g. by the same photodetector component as used for detecting the beam 19, the same amplifier chain supplying the comparator stage with a signal marking the start of the interval to be measured and which is transmitted to the time measuring device 12.

The main beam 16 and the secondary beam 20 are in phase and of the same shape, only their amplitudes differing.

The assembly combining a linear polarizer and a quarter-wave plate makes it possible to obtain independence of disturbances which would bring about the energy return to the microlaser, due to the entrance face 29 positioned under normal incidence with respect to the path of the laser beam 14. Thus, for energy sampling purposes, it is merely necessary to give the polarizer a supplementary polished face 29 and therefore recover the energy which would previously have been lost.

Therefore this device makes it possible to fulfil two functions, namely the optical beam polarization function and the signal sampling function.

The structure of a microlaser is e.g. described in the article by N. Mermilliod et al in Applied Physics Letters vol. 59, No. 27, p 3519, 1991 and consists of a stack of multilayers. The active laser medium is constituted by a material of limited thickness, between 150 and 1000 µm and of small size (a few mm$^2$), on which dielectric cavity mirrors are directly deposited. This active medium can be pumped by a III-V laser diode which is either directly hybridized on the microlaser, or is coupled to the latter by an optical fibre.

In conventional manner the constituent material of the active medium is doped with neodymium (Nd) for a laser emission around 1.06 µm. This material can e.g. be chosen from one of the following materials: YAG ($Y_3Al_5O_{12}$), LMA ($LaMgAl_{11}O_{19}$), $YVO_4$, YSO ($Y_2SiO_5$), YLF ($YLiF_4$) or $GdVO_4$, etc. This choice will be conditioned by the following criteria:

a high absorption coefficient at the wavelength of the pump (e.g. around 800 nm for a III-V laser diode) in order to increase the pumping efficiency, whilst maintaining a limited material thickness (<1 mm), a wide absorption band at the wavelength of the pump of approximately 800 nm in order to comply with the problem of laser diode wavelength stabilization and thus simplify the choice and electrical control of the pumping laser diode, a large, effective stimulated emission cross-section to obtain high output powers and high efficiencies, a limited width of the emission band in order to easily obtain a monofrequency laser, or conversely a wide emission band to obtain a frequency-tunable laser emission, good thermomechanical properties to simplify the machining of the material and limit the prejudicial thermal effects by a good dissipation of the heat produced by the absorption of the pump (said excess heat depending on the energy efficiency of the laser), a long service life in the excited state for a long energy storage period, or a short life for a rapid switching rate, large dimensions so as to permit simultaneously by mass production, the largest possible number of microlasers with one laser crystal.

In general, none of the known materials simultaneously meets all said criteria. However, among the known materials, those most appropriate for microlaser operation are:

$YVO_4$, which has a good coefficient and wide absorption band, as well as a good effective cross-section, but its thermal conductivity is poor, only small dimensions are obtained and it is fragile;

YAG, whose absorption coefficient and effective, stimulated emission cross-section are average and whose absorption and emission band widths are low, but it has a good thermal conductivity for large dimensions and when doped with neodymium (Nd), it is the best known and at present most widely used solid laser material;

LMA, which offers a low absorption coefficient and low effective cross-section, but the absorption and emission bands are wide, it has a large size, but its thermal conductivity is poor.

For emissions at other wavelengths, different materials and dopants will be chosen. In general, the active ions are chosen from among:

Nd for an emission around 1.06 µm,

Er or an erbium-ytterbium Er+Yb codoping for an emission around 1.5 µm,

Tm or Ho or a thulium and holmium codoping for an emission around 2 µm.

Another decisive parameter is the thickness e of the active medium. This thickness e conditions the characteristics of the microlaser:

on the one hand, the absorption of the pumping beam will be higher as the thickness e increases, on the other hand, the number of longitudinal modes of a Fabry-Perot cavity increases in proportion with the thickness and, if it is wished to obtain a longitudinal monomodal laser, said thickness will be small and for a monofrequency laser generally the minimum thickness is chosen for N=1, provided that said thickness is >100 µm, the typical thicknesses for obtaining a single mode being:

| YAG | L = 750 µm, |
| --- | --- |
| $YVO_4$ | L = 500 µm, |
| LMA | L = 150 µm. |

Thus, in practice, the thickness e will vary between 100 µm and 5 mm.

In order to switch the microlaser cavity, to it are added variable losses in time, which will prevent the laser effect for a certain time, during which the pumping energy is stored in the excited level of the gain material. These losses are suddenly decreased at precise times, thus releasing the stored energy in a very short time (giant pulse).

In the case of passive switching, the variable losses are introduced into the cavity in the form of a so-called saturable absorbent or SA, which is highly absorbent at the laser wavelength and low power density and which becomes virtually transparent when said density exceeds a certain threshold, which is called the SA saturation intensity.

According to an embodiment of the invention, the saturable absorbent is in the form of a thin layer directly deposited on the solid active medium.

Figure 3A:
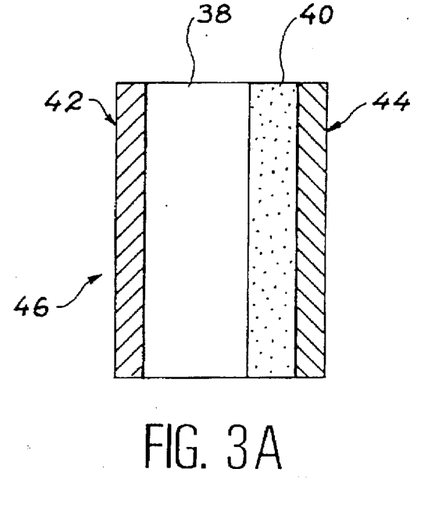

An embodiment of the cavity is illustrated in FIG. 3a, where reference numeral 38 designates the active medium, 40 the thin saturable absorbent layer, said two elements being located between two mirrors 42 and 44 which close the laser cavity, which is designated by the reference 46.

For the saturable absorbent 40 it is possible to use a thin layer constituted by a polymer containing saturable absorbent molecules. Typically for a microlaser at 1.06 µm, it is possible to use as the saturable absorbent an organic dye such as bis(4-diethylaminodithiobenzyl)nickel (BDN, Kodak, CAS No. 51449-18-4) in a solution containing 6 wt. % polymethyl methacrylate (PMMA) in chlorobenzene.

Other polymers such as polyvinyl alcohol or polyvinyl acetate or polystyrene can be used in their respective solvents in place of PMMA. It is also possible to use as the dye bis(4-dimethylaminodithiobenzyl)nickel (BDN, Kodak, CAS No. 38465-55-3).

The dye can also be incorporated into a silica gel or can be grafted to the polymer chain.

Numerous other metal complexes and dithienes can be used as the dye.

The technique can be used for the switching of lasers operating at wavelengths other than 1.06 µm. For example, lasers doped with erbium or an ER⁺Yb complex emitting at around 1.5 um will be switched with tetraethyloctahydrotetraazapentaphene-dithiolato-nickel.

This type of solution will be deposited by means of a whirler directly onto the laser material (cf. hereinafter for details of the preparation process). This gives thin layers or films with a thickness of approximately 1 to 5 μm.

Figure 4A:
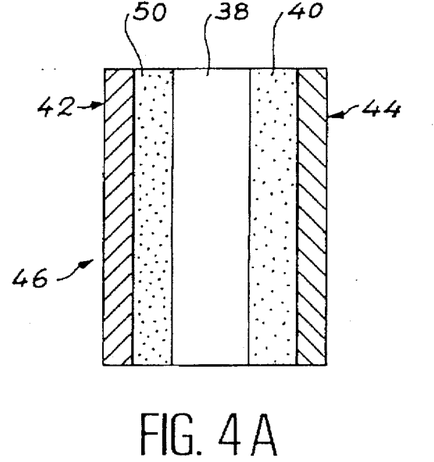

According to another embodiment of the invention and as illustrated in FIG. 4a, it is possible to deposit a saturable absorbent layer 50, 40 on each side of the active laser material 8. This makes it possible to absorb more energy of the pumping beam, but the film located on the side of the entrance of the pumping beam will be subject to greater wear due to said beam. The references 42 and 44 represent the cavity input and output mirrors.

Figure 3B:
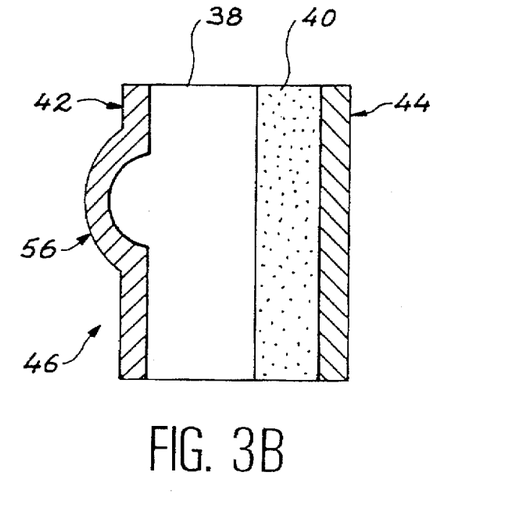
Figure 4B:
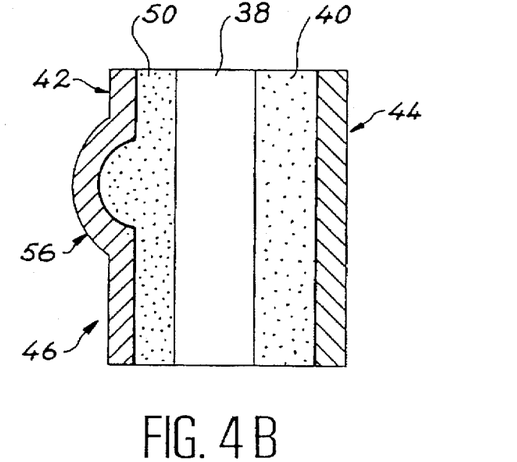

Using a prior art method (article by A. Eda et al., published in CLEO '92, paper CWG33, p 282, Conference on Laser and Electro-optics, Anaheim, USA, May 1992) it is possible to manufacture an array of microlenses 56 made from a transparent material (silica, etc.) on the surface of the laser material 38. The typical dimensions of these microlenses are diameter 100 to a few hundred micron and radii of curvature of a few hundred micrometers to a few millimeters. These microlenses are used for producing "stable" cavities of the planoconcave type as illustrated in FIG. 3b or FIG. 4b in the case of the presence, on the entrance face, of a second saturable absorbent layer 22. They also make it possible to focus the pumping beam.

The input mirror 42 deposited by known processes can be dichroic mirror having a maximum reflectivity (as close as possible to 100%) at the laser wavelength and the highest possible transmission (>80%) at the pumping wavelength (generally 800 nm for Nd doped materials, 980 nm for Er doped materials and 780 nm for Tm doped materials). The output mirror 44 can also be of the dichroic type, but permits the passage of a few per cent of the laser beam.

A process for the production of such a microlaser cavity will now be described. The following seven stages occur in this process:

1) A first stage of choosing the active laser material. The possible materials which can be used have already been described.
2) A stable of conditioning the chosen crystal, which is oriented and cut into plates with a thickness between 0.5 and 5 mm.
3) A stage of grinding and polishing the plates using known processes.
4) A stage of preparing and depositing a thin saturable absorbent layer. This layer is constituted by an organic, saturable absorbent dye dissolved in a polymer. Hereinbefore has been given the example of BDN dissolved in PMMA. Such a solution is filtered and deposited on the substrate, on the exit face (opposite to the entrance face having the dichroic mirror) in dropwise manner and with a circular centrifugal movement. For this purpose it is possible to use a whirler, a standard machine like that used in microelectronics for depositing resins used in lithography operations. Previously all traces of impurities resulting from the polishing operation are cleaned from the substrate. It is rotated for 20 seconds at 2000 r.p.m. and then for 30 seconds at 5000 r.p.m. The layer is then left to dry for 2 hours in an oven at 70° C.

This gives a 1 μm thick film containing 3% active molecules (BDN) and whose optical intensity is 0.13 to 1.06 μm (74% transmission) before saturation.

By varying the polymer concentration parameters, its molecular weight or its solvent, the proportion of dye and the rotation speed of the whirler, it is possible to adjust the performance characteristics of the saturable absorbent.

Other examples of polymers and dyes are given hereinafter.

5) A stage of depositing the input mirror, which is a dichroic mirror obtained by dielectric multilayer deposition and is carried out before or after stage 4).
6) A stage of depositing the output mirror on the thin layer, using the same methods as for 5).
7) A stage of cutting up plates in order to obtain microlaser chips. Cutting can e.g. take place with a diamond saw, of the type used in microelectronics for SI chip cutting. This can be followed by the cutting up of the wafers obtained into "small chips" of a few mm² in order to recover the thus produced laser cavities.

The laser chip obtained is then integrated in a box with its pumping source (laser diode).

As has been described hereinbefore, the lasers obtained can be of the monofrequency type, because the length of the cavity can be small, namely a few hundred micrometers. Thus, it is possible to obtain a single longitudinal mode in the gain band of the laser crystal (1 to 3 nanometers as a function of the materials). Moreover, a longitudinal pumping permits the optimization of the overlap integral between the spatial distribution of the gain (image of the pump) and that associated with the transverse mode of the laser cavity.

Moreover, the emission wavelength can be very easily adjusted in a very precise manner to 1 to 2 namometers, either by adjusting the laser chip temperature, or by adjusting its length by a piezoelectric cell or by an electrooptical component in a configuration of two coupled cavities. The wavelength can be stabilized by controlling the temperature or length of the cavity, by piezoelectric or electrooptical effect. With the saturable absorbent structure defined hereinbefore, it is possible to obtain very brief pulses (lasting less than 1 nanosecond) and with high peak powers (more than 1 kW). At present, the pulses obtained have rise times below 300 picoseconds, which means that for a light pulse transit time measurement, the precision is 2 cm for a signal to noise ratio of 4 and this is for a single measurement, i.e. without statistical accumulation. This precision cannot be obtained for telemeters or rangefinders using laser diodes. Thus, the injection currents necessary for producing the necessary power then exceed 20 amperes, with rise times of 300 picoseconds, which is unobtainable due to limitations caused by parasitic inductances and junction capacitances.

A description will now be given of the detection circuit 12 in FIG. 1. An embodiment of this circuit is described hereinafter in conjunction with FIGS. 5 to 8. This circuit makes it possible to measure the time interval or slot between the microlaser pulse emission time and the return of said pulse after reflection on an object. This circuit makes it possible to take account of the non-synchronism of a few μs fluctuation between the pulse of the microlaser and the clock of the time measuring device.

For measuring the duration of the time slot between the emitted light pulse D and the received pulse F, measurement takes place of the rough part of the time slot in digital manner and the fine part in analog manner.

The thus acquired parameters are then recombined to obtain the result. The time measurement is consequently obtained by combining a digital quantity in the form of a number of counted clock periods and analog quantities obtained by conversion of time into voltage amplitudes.

Figure 5:
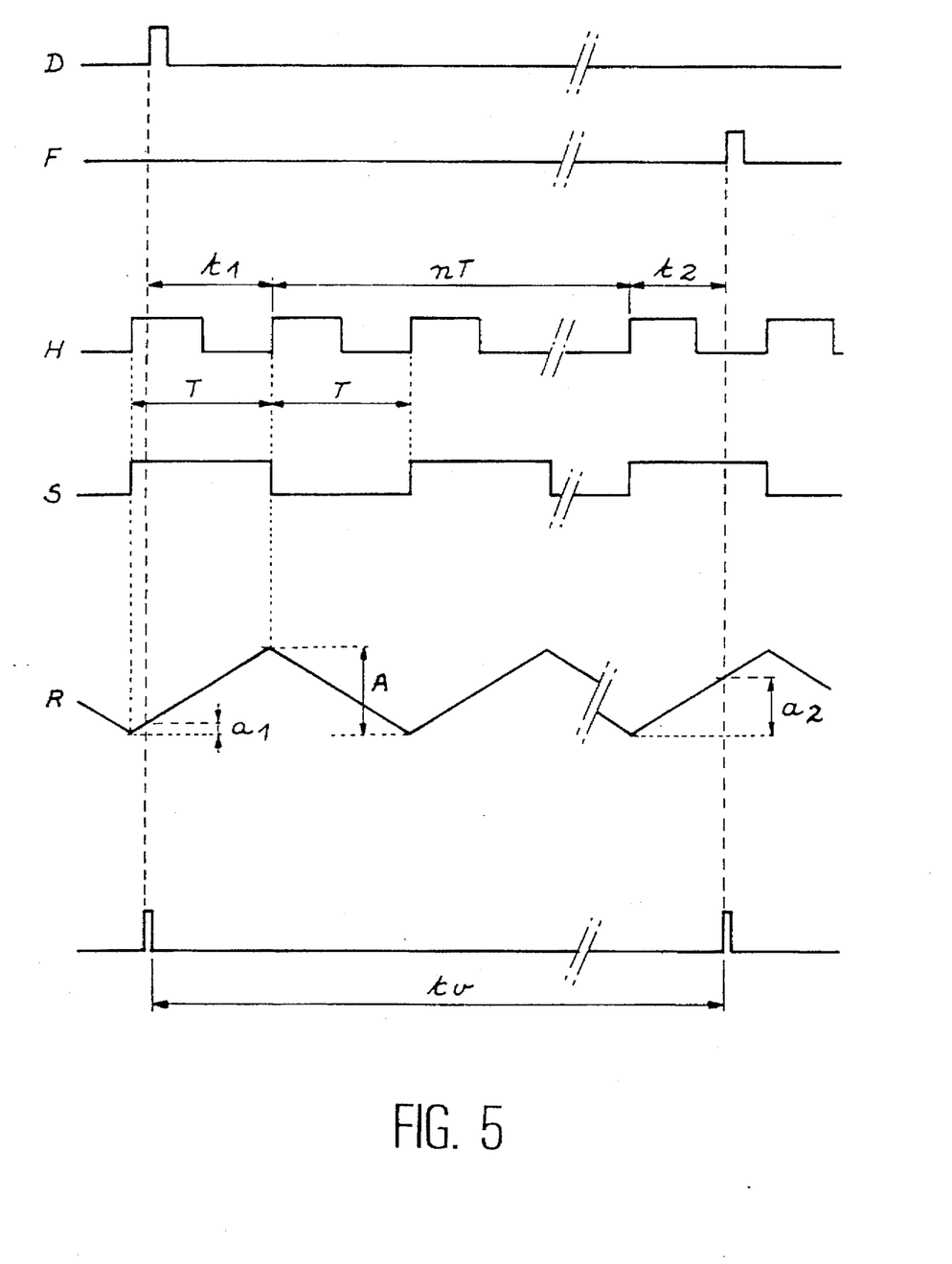
FIG. 5 A timing diagram illustrating the principle of the measurement of the transit time used in a device according to the invention.

This principle is more specifically illustrated with the aid of the timing diagram of FIG. 5. The aim is to measure the time interval $t_v$ between the starting pulse D (slot start signal, transmitted to the device 12 and corresponding to the pulse emitted by the microlaser) and the pulse for the end of the slot to be measured F (stop signal of the slot transmitted to the device 12 and corresponding to the return pulse 18).

For this purpose use is made of a basic clock H of period T, whereof counting takes place of the number n of periods during the time $t_v$. The total time corresponding to the passing of this period is nT. As the clock is not synchronous with the start signal D and stop signal F, it is also necessary to determine the time $t_1$ elapsing between the start signal D and the beginning of the first clock pulse commencing after D and on the other the time $t_2$ elapsing between the stop signal F and the end of the final clock period completed before the signal F. To obtain the duration of the time slot $t_v$, it is then merely necessary to add the three measured times: $t_1+nT+t_2$.

To determine $t_1$ and $t_2$ use is made of a triangular signal R of period 2T, amplitude A and synchronous with the basic clock of period T. At any instant, if a is the amplitude measured on the ramp, the t elapsed since the start of the ramp is equal to T/A·a. By sampling the ramps on the appearance of the start signal D and the stop signal F, amplitudes $a_1$ and $a_2$ are obtained, which rspectively represent $t_1$ and $t_2$.

If the starting pulse occurs during a rising ramp, we obtain: $t_1=T/A·a_1$.

If the starting pulse occurs during a falling ramp, we obtain: $t_1=T-T/A·a_1$.

If the stop pulse F occurs on a rising ramp, we obtain: $t_2=T/A·a_2$.

If the stop pulse F occurs on a falling ramp, we obtain: $t_2=T-T/A·a_2$.

$t_1$ and $t_2$ are then digitized, which gives two corresponding values $T_1$ and $T_2$. Thus, the duration of the time slot is obtained: $t_v=nT+T_1+T_2$.

Figure 6:
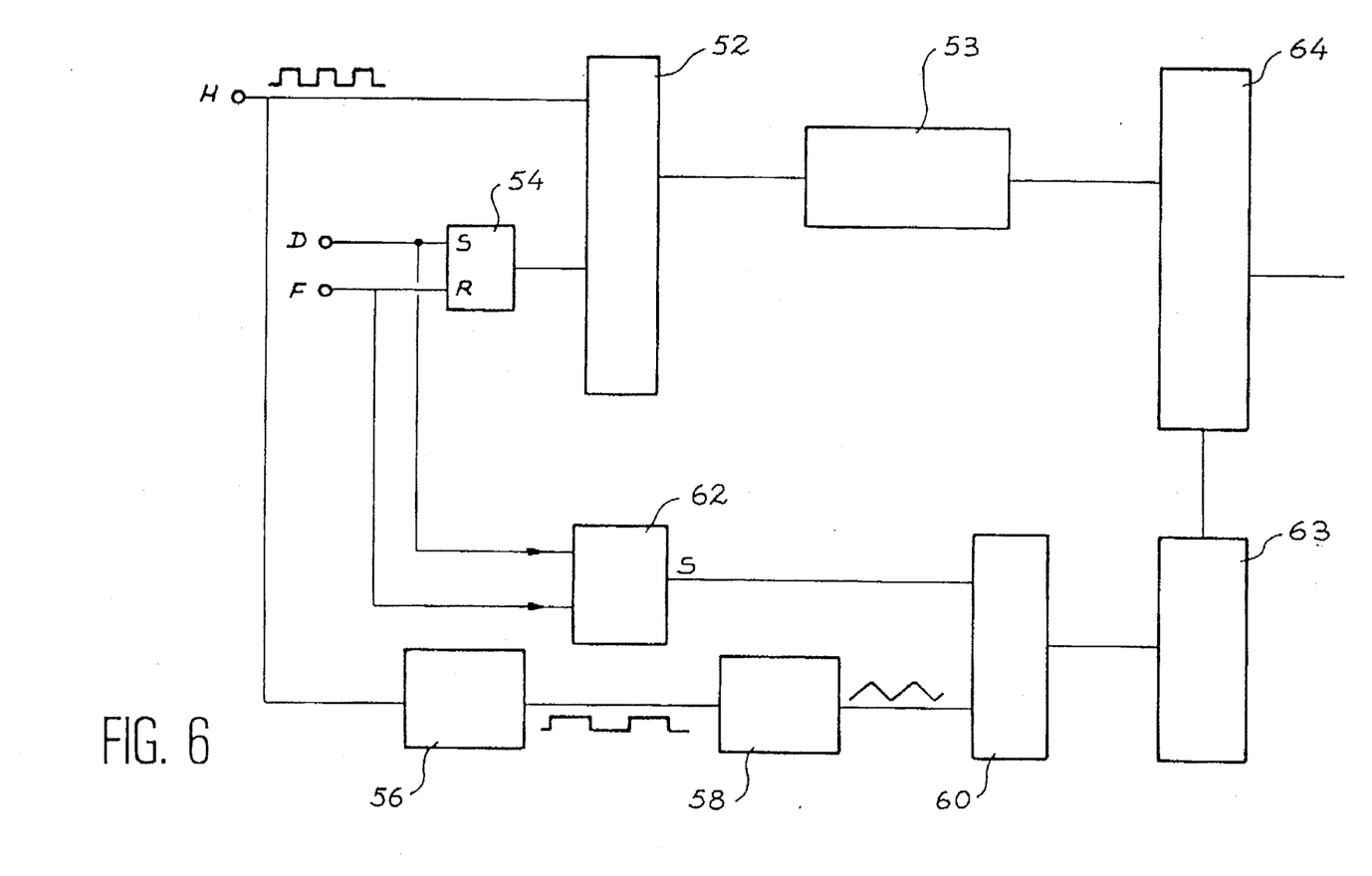
FIG. 6 A device for implementing the principle illustrated in FIG. 5.

A device for performing the invention is shown in FIG. 6. A clock H supplies pulses of period T to one of the inputs of an AND gate, designated by the reference 52. This clock H can be produced from a crystal quartz oscillator operating e.g. at a frequency of 200 MHz. The other input of the AND gate receives a signal from the output Q of a R-S flip-flop designated by the reference 54, to whose input S is supplied the start signal D, whilst the input R is controlled by the stop signal F. The unit constituted by the AND gate, flip-flop 54 and clock H constitutes a digital measuring circuit making it possible to obtain a rough value of the time slot to be measured. This value is equal to nT, in which n is the number of clock periods T which have elapsed between the start signal D and the stop signal F and is counted in a counter 53.

In parallel, a division of the frequency of the signals of the clock H is performed by a divider 56, e.g. formed by a flip-flop, the output of said divider supplying a ramp generator 58. This generator can be implemented by the constant current charging and discharging of a capacitor. The period and gradient of these ramps are very well defined. The output of the ramp generator 58 is supplied to a fast analog-digital converter 60 (e.g. of the flash type or fast sampler+converter), whereof another input receives a signal e.g. from a flip-flop 62, controlled by the start signal D and stop signal F of the period to be measured. Thus, the converter 60 samples the information on the amplitude of the ramp at the start time D and stop time F of the time slot to be measured, as well as the information relative to the parity of the ramp at these instants, i.e. its rising or falling character. This converter makes it possible to obtain information concerning the values $T_1$ and $T_2$ and which is stored in a memory 63.

The rough information relating to nT and the "fine" information relating to the slots $T_1$ and $T_2$ are supplied to a processing circuit 64, which calculates the duration $t_v$ of the time slot to be measured.

This device makes it possible to obtain a good precision, because it gives freedom from any synchronization of the measurement start signal D and stop signal F relative to the timer or chronometer clock H. It also makes it possible to obtain freedom from the limited capacity of the chronometer for determining a small and a very long time deviation able to vary between a few seconds and infinity, due to the fact that its frequency is fixed.

This device also makes it possible to determine long time intervals with a constant precision, no matter what the duration of said time interval. This is not true in the case of the prior art time slot duration measuring devices, particularly that described in French patent application 93 08145 of Feb. 7, 1993. Thus, the latter device a capacitor is discharged at the start of the measurement of the time slot and at the end of said measurement the same capacitor is charged. However, the charge measured immediately after the arrival of the signal D can vary before reaching the final part of the time slot to be measured, just prior to the stop signal F and this increases as the time slot to be measured lengthens. In the device according to the invention, this problem is avoided by using recurrent ramps.

Finally, this type of device can easily be integrated in order to bring about a compact circuit.

Another embodiment of the circuit 12 makes it possible to take account of problems linked with ambiguity situations on the start signal D and the stop signal F. These problems arise when one or other of the signals occur simultaneously at a rising or falling front or edge of the signals of the clock. The counter of the digital part of the device, which determines the rough measurement of the time slot, can then count a supplementary clock pulse, which would not have been counted.

Figure 7:
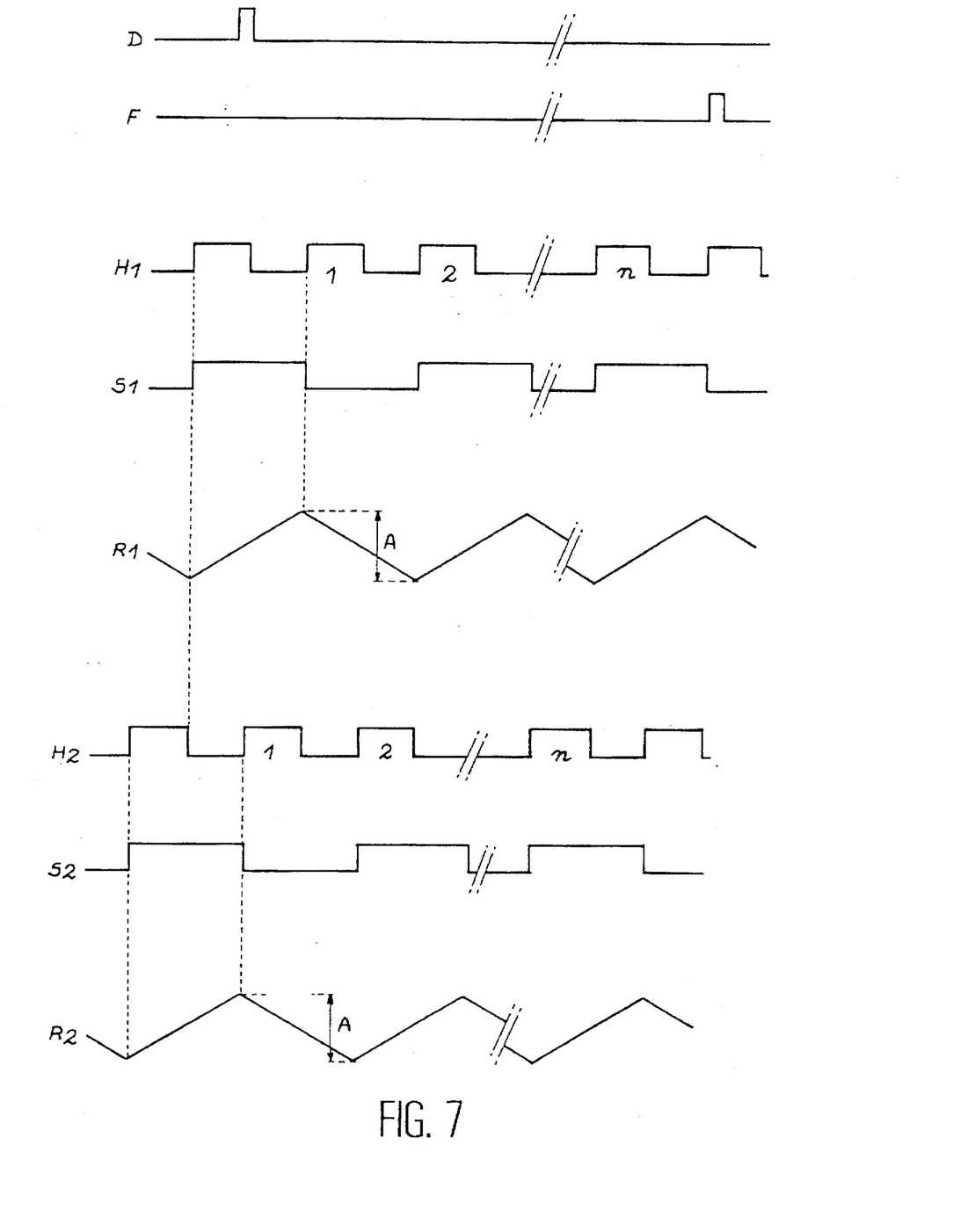
FIG. 7 A timing diagram illustrating another method for measuring the transit time in a device according to the invention.

So as to solve this problem, the invention proposes a device operating on the principle illustrated in FIG. 7. In accordance with what has already been explained hereinbefore, a clock $H_1$ supplies signals of period T. A divider makes it possible to generate signals $S_1$ of period 2T synchronized with the signals of the clock $H_1$. It is thus possible to generate rising and falling ramps $R_1$ of amplitude A. A delay or lag device makes it possible to generate a second signal or clock $H_2$, on the basis of the signal $H_1$, the signals $H_2$ being shifted by T/2 with respect to the signals of $H_1$. Thus, a falling edge of a square wave pulse of $H_2$ corresponds to a rising edge of a square wave pulse of $H_1$, as can be seen in FIG. 7. This signal of clock $H_2$ makes it possible to generate in the manner described hereinbefore for clock $H_1$, a signal $S_2$ of period 2T, which will itself control a ramp $R_2$ of the same amplitude A as the ramp $R_1$. When the measurement start signal D occurs, simultaneous sampling takes place of the two ramps $R_1$ and $R_2$. If there is e.g. ambiguity between D and $H_1$, i.e. if the signal D is superimposed on a rising edge of a square wave pulse of $H_1$, it is not possible for there to be simultaneously ambiguity between the signal D and the signals generated by $H_2$, due to the shift by a half-period between the two channels. Consequently, it is merely necessary to identify the clock which is not in an ambiguity situation with the start signal D and to then only retain the sampled value of the corresponding ramp R in order to determine $t_1$. For example, if the ambiguity situation occurs between the start signal D and the clock $H_1$, the valid clock for determining the measurement of $t_1$ is the clock $H_2$ and the value to be taken into account is that measured on the ramp $R_2$.

The same situation occurs for any ambiguity on the signal F. When the stop signal F occurs, simultaneous sampling takes place on the two ramps $R_1$ and $R_2$. For $t_2$ is taken the value of the ramp $R_1$ and $R_2$ from the clock $H_1$ or $H_2$ not having an ambiguity with the signal F.

In the case where the ambiguity situation exists simultaneously on D and F, it is possible to add a third circuit with a clock $H_3$ shifted with respect to $H_2$ and $H_1$.

In the case where there is no ambiguity, neither with the clock $H_1$, nor with the clock $H_2$, the time values obtained ($t_1$ or $t_2$) will be taken on one or other of the two circuits corresponding to the two clocks.

Figure 8:
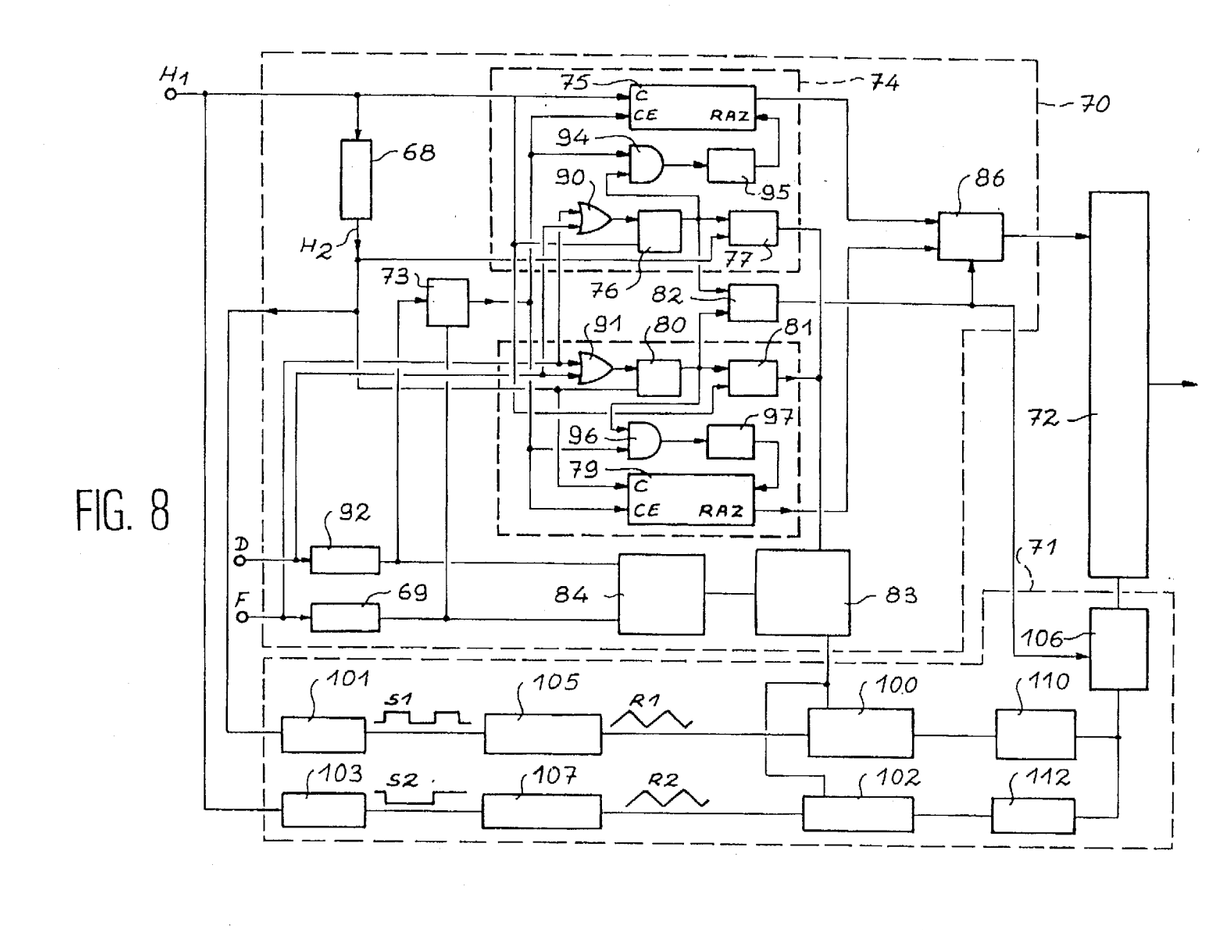
FIG. 8 A device for implementing the principle illustrated in FIG. 7.

The device corresponding to this embodiment of the invention is illustrated in FIG. 8, where in a first block 74 a first counter 75 receives on its authorization input CE a counting order from a flip-flop 73 and on its input C the signal of clock $H_1$. The output data from the first counter 75 are transmitted to a processing circuit 72 by means of a switching or routing circuit 86 controlled by an OR gate 82.

The D-flip-flops 76 and 80 receive the signals D and F by means of an OR function 90, 91 on their input D. The flip-flop 73, which supplies the authorization signal CE is also controlled by the signals D and F, which are both delayed by a quantity close to three propagation times in the gates by the devices 69, 92, which are e.g. constituted by time lags in the logic gates. The first AND gate 77 implements the AND function of the output of the flip-flop 76 and the clock $H_2$. The signals of the latter are obtained from $H_1$ and a lag circuit 68, e.g. constituted by propagation times in the gates.

In the second block 78, a second counter 79 receives on its authorization input CE a counting order from flip-flop 73. The data of said counter 79 are transmitted to the processign circuit 72 via the circuit 86. The second D-flip-flop 80 functions in the manner described hereinbefore. The second AND gate 81 implements the AND function between the output of the circuit 80 and the clock $H_1$.

The output of the circuit 82 controls the operation of the switching or routing circuit 86 to obtain the reading of the counter 75 or 79, whose D-flip-flop 76 or 80 has not switched first. It detects the first of the flip-flops 76 or 80 which has switched and it authorizes the reading of the counter, whose flip-flop has not changed state.

If there is an uncertainty situation, e.g. at the start of the count, for one or other of the counters, the first of the present identification circuits 76, 80 which switches validates the choice between the clocks $H_1$ or $H_2$. The validated counter is left unchanged, whereas the other counter is zeroed prior to the arrival of the second clock pulse following the signal D. This is carried out by the circuits 94, 95 and 96, 97 respectively for the first and second counters. The circuits 94 and 96 are AND gates, whereas circuits 95 and 97 are of the time shaping type.

A R-S-flip-flop 83 receives on its set input the output of an OR gate 84, whereof the inputs correspond to the signals D and F delayed by the circuits 92 and 69. The flip-flop 83 receives on its other input the outputs of the two AND gates 77, 81.

This flip-flop 83 controls an input of an analog-digital converter 100 and an input of an analog-digital converter 102. Another input of each of these converters 100, 102 is connected to the clock $H_1$, respectively $H_2$ by means of a flip-flop 101, respectively 103, which makes it possible to generate a signal $S_1$, respectively $S_2$ of period 2T, and a ramp generator 105, respectively 107, for generating a ramp R1, respectively R2. Downstream of the analog-digital converters, there are two memories 110, 112 and a switching circuit 106 controlled by the circuit 82.

It is now necessary to describe the measurement of the outward and return time path of a light pulse emitted by the microlaser and reflected by an object. For this purpose reference should be made to FIGS. 9a and 9b, which respectively describe the time evolution of an emitted light pulse and that of a received light pulse. If d is the distance between the emitter (i.e. the microlaser) and the target and c is the speed of light, $t_d$ is the outward and return path, so that we obtain $t_d=2d/c$.

Figure 9A:
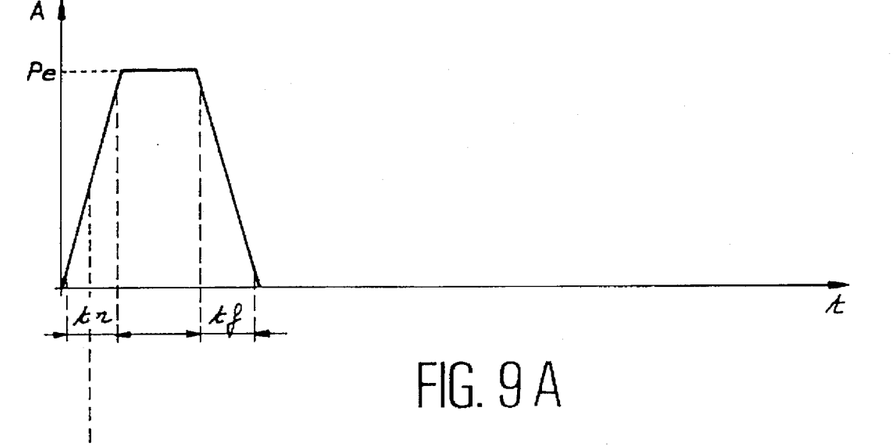
FIGS. 9a and 9b The respective time evolution of a light pulse emitted by the microlaser and a light pulse received by the device after reflection on an object.
Figure 9B:
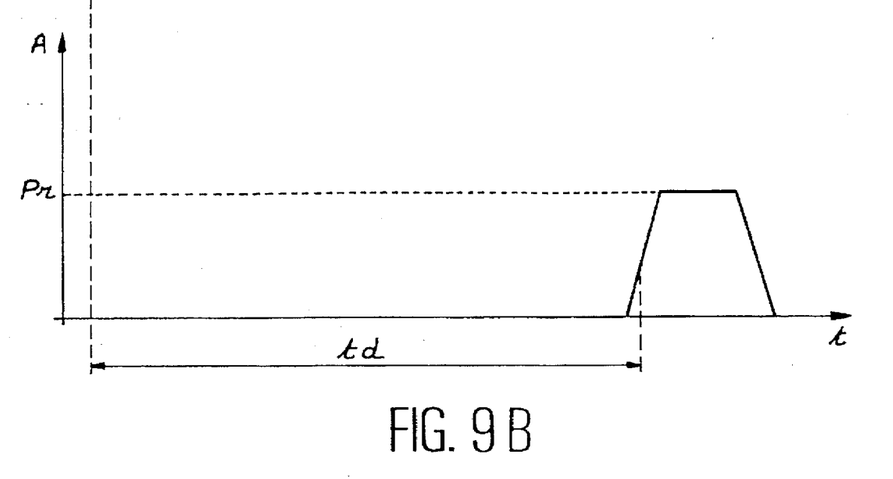

The ratio of the received power $P_r$ as a function of the emitted power $P_e$ is equal to: $P_r/P_e = k_r.K_d.1/d_2$ in which $K_t$ is the atmospheric transmission coefficient and $K_d$ the diffusion coefficient of the material constituting the object.

The accuracy of the measurement is given by $\sigma_x = t_r.c/2.36.snr$ in which $t_r$ is the pulse rise time and snr the signal to noise ratio on detection.

On the basis of this formula and the value of the rise time given hereinbefore, in conjunction with the performance of the microlaser (rise time below 300 picoseconds), it is clear that it is possible to obtain a precision of 2 cm for a signal to noise ratio of 4 on a single measurement and without statistical accumulation.

We claim:

1. Laser telemetry device operating on the principle of measuring the transit time of a light pulse, comprising:
   a passively switched microlaser, for emitting light pulses, comprising a solid active medium, a saturable absorbent, an input mirror an output mirror, the saturable absorbent being a thin, saturable absorbent material layer directly deposited on said solid active medium,
   means for the reception of light pulses reflected by an object and for the detection of a reception time of said pulses,
   means for the detection of the emission time of light pulses emitted by the microlaser,
   means for measuring the time interval separating the emission time of a microlaser light pulse from the reception time of a pulse reflected by said object.

2. Device according to claim 1, wherein the solid active medium comprises a basic material selected from the group consisting of $Y_3Al_5O_{12}$, $LaMgAl_{11}O_{19}$, $YVO_4$, $Y_2SiO_5$, $YLiF_4$, and $GdVO_4$ and wherein the basic material is doped with ions selected from the group consisting of neodymium (Nd) ions, erbium (Er) ions, thulium (Tm) ions, holmium (Ho) ions, a mixture of erbium ions and ytterbium ions (Er+Yb), and a mixture of thulium ions and holmium ions (Tm+Ho).

3. Device according to claim 1, wherein the thin layer comprises an organic dye dissolved in a polymer solvent.

4. Device according to claim 3, wherein the organic dye is selected from the group consisting of bis(4-diethylaminodithiobenzyl)nickel and bis(4-dimethylaminodithiobenzyl)nickel and the solvent comprises a solution selected from the group consisting of polymethyl methacrylate (PMMA), polyvinyl alcohol, polyvinyl acete and polystyrene.

5. Device according to claim 1, wherein the thin layer is obtainable by liquid phase epitaxy.

6. Device according to claim 1, wherein the microlaser comprises a second saturable absorbent layer.

7. Device according to claim 1, wherein the microlaser has an array of microlenses formed thereon.

8. Device according to claim 1, wherein the input and output mirrors are dichroic mirrors.

9. Laser telemetry device operating on the principle of measuring the transit time of a light pulse comprising:

a passively switched microlaser, means for the reception of light pulses reflected by an object and for the detection of a reception time of said pulses, means for the detection of the emission time of light pulses emitted by said microlaser, means for measuring the time interval separating said emission time of a microlaser light pulse from the reception time of a pulse reflected by said object, said means for measuring the time interval further comprising:

a linear polarizer having two prisms and made from birefringent material assembled according to a junction face, placed on said microlaser pulses' associated transmission path in such a way that the microlaser light pulses penetrate the same by an entrance face belonging to one of the prisms and pass out of the same by an exit face belonging to the other prism, the entrance face and exit face being polished and perpendicular to the associated transmission path of the microlaser pulses, a quarter-wave plate positioned parallel to the exit face of the polarizer, means located on the transmission path of the microlaser light pulses passing out of the quarter-wave plate, in order to split said microlaser light pulses into a first part transmitted for forming a main pulse and a second part reflected to the quarter-wave plate and the linear polarizer for constituting a secondary pulse, the linear polarizer having a third polished face permitting the sampling of the secondary pulse ejected from the linear polarizer.

10. Laser telemetry device operating on the principle of measuring the transit time of a light pulse, comprising:

a passively switched microlaser, means for the reception of light pulses reflected by an object and for the detection of a reception time of said pulses, means for the detection of the emission time of light pulses emitted by said microlaser, means for measuring the time interval separating said emission time of a microlaser light pulse from the reception time of a pulse reflected by said object, said means for detection of the emission time of said microlaser light pulses transmitting to said means for measuring the time interval a start signal (D) marking the start of the time interval to be measured, said means for the reception of said reflected light pulses transmitting to said means for measuring the time interval a stop signal (F) marking the end of the time interval to be measured, said means for measuring the time interval comprising:
a first clock supplying pulses with a period T, said first clock having an associated start of a first pulse commencing after start signal (D) and an associated end of a final period completed before the occurrence of stop signal (F), a digital circuit for counting the number of pulses of the first clock followed by a complete period T and which are located between the start signal (D) and the stop signal (F), an analog circuit for determining first analog data corresponding to on the one hand a time $t_1$ separating the start signal (D) and the first pulse of the first clock commencing after start signal (D) and on the other hand a time $t_2$ separating the stop signal (F) from the end of the final period of the first clock completed before the occurrence of stop signal (F) and able to convert said first analog data obtained into digital data, a processing circuit for determining the duration of the time interval on the basis of data corresponding to said number of pulses counted by the digital circuit and said first analog data supplied by the analog circuit previously converted into digital data.

11. Device according to claim 10, provided with a second clock ($H_2$) having an associated start of a first pulse commencing after start signal (D) and an associated end of a final period completed before the occurrence of stop signal (F), and whose pulses are shifted compared with those of the first clock ($H_1$), the digital circuit also counting the number of pulses of the second clock followed by a complete period T and occurring between the start signal (D) and the stop signal (F), the analog circuit determining second analog data corresponding to on the one hand a time $t_3$ separating the start signal (D) and the start of the first pulse of the second clock commencing after start signal (D) and on the other hand a time $t_4$ separating the stop signal (F) from the end of the final period of the second clock completed before the occurrence of stop signal (F), said analog circuit being able to convert said second analog data obtained into digital data and also having means able to determine which of said first and second analog data is to be taken into account, so as to resolve any ambiguity situation which could lead to a clock period counting error.

12. Device according to claim 2, the thin layer being constituted by an organic dye dissolved in a polymer solvent.

13. Device according to claim 5, the microlaser having a second saturable absorbent layer.

14. Device according to claim 6, wherein the microlaser has an array of microlenses formed thereon.

15. Device according to claim 7, the input and output mirrors being dichroic mirrors.

16. Device according to claim 8, wherein the means for detecting the emission time of microlaser light pulses comprises:

a linear polarizer having two prisms and made from birefringent material assembled according to a junction face, placed on said microlaser pulses' associated transmission path in such a way that the microlaser light pulses penetrate the same by an entrance face belonging to one of the prisms and pass out of the same by an exit face belonging to the other prism, the entrance face and exit face being polished and perpendicular to the associated transmission path of the microlaser pulses, a quarter-wave plate positioned parallel to the exit face of the polarizer, means located on the transmission path of the microlaser light pulses passing out of the quarter-wave plate, in order to split said microlaser light pulses into a first part transmitted for forming a main pulse and a second part reflected to the quarter-wave plate and the linear polarizer for constituting a secondary pulse, the linear polarizer having a third polished face permitting the sampling of the secondary pulse ejected from the linear polarizer.

17. Device according to claim 9, wherein the means for detection of the emission time of said microlaser light pulse, transmitting to said means for measuring the time interval a start signal (D) marking the start of the time interval to be measured, the means for the reception of said reflected light pulses transmitting to said means for measuring the time interval a stop signal (F) marking the end of the time interval to be measured, and the means for measuring the time interval comprises:
- a first clock supplying pulses with a period T, said first clock having an associated start of a first pulse commencing after start signal (D) and an associated end of a final period completed before the occurrence of stop signal (F),
- a digital circuit for counting the number of pulses of the first clock followed by a complete period T and which are located between the start signal (D) and the stop signal (F),
- an analog circuit for determining first analog data corresponding to on the one hand a time $t_1$ separating the start signal (D) and the first pulse of the first clock commencing after start signal (D) and on the other hand a time $t_2$ separating the stop signal (F) from the end of the final period of the first clock completed before the occurrence of stop signal (F) and able to convert said first analog data obtained into digital data,
- a processing circuit for determining the duration of the time interval on the basis of data corresponding to said number of pulses counted by the digital circuit and said first analog data supplied by the analog circuit previously converted into digital data.

18. Device according to claim 10, wherein the microlaser has a solid active medium comprising a basic material selected from the group consisting of $Y_3Al_5O_{12}$, $LaMgAl_{11}O_{19}$, $YVO_4$, $Y_2SiO_5$, $YLiF_4$, and $GdVO_4$ and wherein the basic material is doped with ions selected from the group consisting of neodymium (Nd) ions, erbium (Er) ions, thulium (Tm) ions, holmium (Ho) ions, a mixture of erbium ions and ytterbium ions (Er+Yb), and a mixture of thulium ions and holmium ions (Tm+Ho).

* * * * *